US010415413B2

(12) United States Patent
Chuong et al.

(10) Patent No.: US 10,415,413 B2
(45) Date of Patent: Sep. 17, 2019

(54) FLOATING NON-CONTACT SEAL VERTICAL LIP (71) Applicant: United Technologies Corporation, Farmington, CT (US)

(72) Inventors: Conway Chuong, Manchester, CT (US); Joey Wong, Enfield, CT (US); Ross Wilson, South Glastonbury, CT (US); Christopher J. Peters, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 408 days.

(21) Appl. No.: 15/254,527

(22) Filed: Sep. 1, 2016

(65) Prior Publication Data

US 2018/0058240 A1 Mar. 1, 2018

(51) Int. Cl.
*F01D 11/02* (2006.01)
*F01D 5/02* (2006.01)
*F01D 9/02* (2006.01)
*F04D 29/08* (2006.01)
*F04D 29/32* (2006.01)
*F04D 29/54* (2006.01)
*F16J 15/44* (2006.01)

(52) U.S. Cl.
CPC ............. *F01D 11/025* (2013.01); *F01D 5/02* (2013.01); *F01D 9/02* (2013.01); *F04D 29/083* (2013.01); *F04D 29/321* (2013.01); *F04D 29/541* (2013.01); *F16J 15/442* (2013.01); *F16J 15/445* (2013.01); *F05D 2220/32* (2013.01); *F05D 2230/12* (2013.01); *F05D 2260/38* (2013.01)

(58) Field of Classification Search
CPC ........ F01D 11/025; F01D 11/04; F01D 11/06; F01D 11/08; F01D 11/02
USPC ...................................................... 415/173.7
See application file for complete search history.

(56) References Cited

U.S. PATENT DOCUMENTS

| 7,182,345 | B2 * | 2/2007 | Justak | ..................... F01D 11/00 |
| | | | | 277/355 |
| 7,735,833 | B2 | 6/2010 | Bruan et al. | |
| 7,896,352 | B2 | 3/2011 | Justak | |
| 8,002,285 | B2 | 8/2011 | Justak | |
| 8,641,045 | B2 | 2/2014 | Justak | |
| 8,919,781 | B2 | 12/2014 | Justak | |
| 9,097,350 | B2 | 8/2015 | Dale | |
| 9,611,749 | B2 | 4/2017 | Thatte et al. | |

(Continued)

OTHER PUBLICATIONS

Extended European Search Report for EP Application No. 17179137.9, dated Jan. 16, 2018, 8 Pages.

*Primary Examiner* — Woody A Lee, Jr.
(74) *Attorney, Agent, or Firm* — Kinney & Lange, P.A.

(57) ABSTRACT

A seal assembly includes an annular base, a spring, a shoe, a first channel, a seal cover, and a seal. The spring includes a beam and is connected to the annular base. The shoe is disposed radially inward of the annular base and connected to the spring. The shoe includes an upstream portion, a downstream portion, and a lip connected to and extending radially outward from the upstream portion of the shoe. The spring extends from the annular base to the shoe. The first channel is positioned between the shoe and the beam of the spring. The seal is disposed between the seal cover and the shoe such that a downstream face of the seal is in contact with an upstream face of the shoe.

15 Claims, 6 Drawing Sheets

(56) References Cited

U.S. PATENT DOCUMENTS

| | | |
|---|---|---|
| 2011/0070072 A1* | 3/2011 | Subramaniyan ........ F01D 5/225 |
| | | 415/173.2 |
| 2011/0121519 A1 | 5/2011 | Justak |
| 2014/0119912 A1* | 5/2014 | Bidkar .................... F01D 11/02 |
| | | 415/229 |
| 2015/0285152 A1 | 10/2015 | Hayford et al. |
| 2015/0322816 A1 | 11/2015 | Schmitz |
| 2016/0109025 A1 | 4/2016 | McCaffrey et al. |
| 2016/0130963 A1 | 5/2016 | Wilson et al. |
| 2017/0211406 A1 | 7/2017 | Peters |

* cited by examiner

FLOATING NON-CONTACT SEAL VERTICAL LIP

STATEMENT OF GOVERNMENT INTEREST

This invention was made with government support under FA8650-09-D-2923-0021 awarded by The United States Air Force. The government has certain rights in the invention.

BACKGROUND

The present disclosure relates generally to seals, and more particularly to floating non-contact seals for use in gas turbine engines.

Honeycomb and knife-edge seals can be used to form a seal at the interface between rotating and static components within the turbine section of a gas turbine engine. Over time, the knife-edge seal can wear a trench into the honeycomb causing gaps and sporadic leaks over time.

Floating non-contact seal configurations allow adaptive radial motion of shoe components relative to a rotating component. Floating non-contact seals can vary a gap between the sealing element and a rotating component by adapting to the change in pressure across the sealing element. A shoe component of the floating non-contact seal is drawn radially inward and outward (toward and away) from the rotating component in response to the pressure across the sealing element. Over time, the radially inward and outward motion of the shoe component can cause sealing elements within floating non-contact seals to break their seal or become damaged against the shoe component.

Structures and configurations of floating non-contact seals are the subject of the following commonly owned U.S. Patent Publications US2016/0130963A1, US2015/0322816A1, and US2015/0285152A1 (incorporated by reference herein in their entireties).

SUMMARY

A seal assembly includes an annular base, a spring, a shoe, a first channel, a seal cover, and a seal. The spring includes a beam and is connected to the annular base. The shoe is disposed radially inward of the annular base and connected to the spring. The shoe includes an upstream portion, a downstream portion, and a lip connected to and extending radially outward from the upstream portion of the shoe. The spring extends from the annular base to the shoe. The first channel is positioned between the shoe and the beam of the spring. The seal is disposed between the seal cover and the shoe such that a downstream face of the seal is in contact with an upstream face of the shoe.

A method of manufacturing a floating non-contact seal includes machining material stock by removing a first amount of material to create an annular base. Plunge electro-discharge machining is performed to remove a second amount of material from the annular base forming a first channel with a lip extending part-way across a height of the first channel. Wire electro-discharge machining is then performed to remove a third amount of material from the annular base creating a first set of channels.

A seal assembly disposed in a gas turbine engine includes a rotating structure, a static structure, and a floating non-contact seal. The static structure is radially aligned with the rotating structure. The floating non-contact seal is disposed between the rotating structure and the static structure. The floating non-contact seal includes an annular base, a spring, a shoe, a first channel, a seal cover, and a seal. The spring includes a beam and is connected to the annular base. The shoe is disposed radially inward of the annular base and connected to the spring. The shoe includes an upstream portion, a downstream portion, and a lip connected to and extending radially outward from the upstream portion of the shoe. The spring extends from the annular base to the shoe. The first channel is positioned between the shoe and the beam of the spring. The seal is disposed between the seal cover and the shoe such that a downstream face of the seal is in contact with an upstream face of the shoe.

DETAILED DESCRIPTION

Figure 1A:
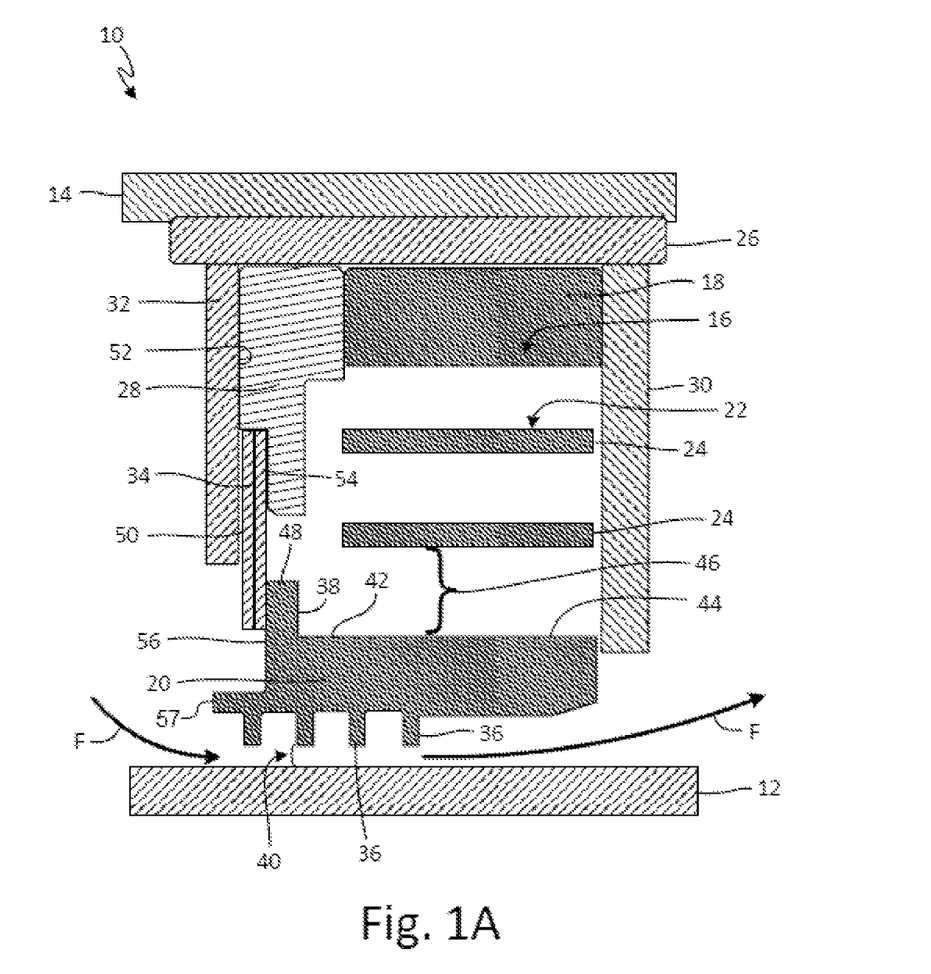
FIG. 1A is a cross-sectional view of a seal assembly with a rotating structure, a static structure, and a floating non-contact seal.
Figure 1B:
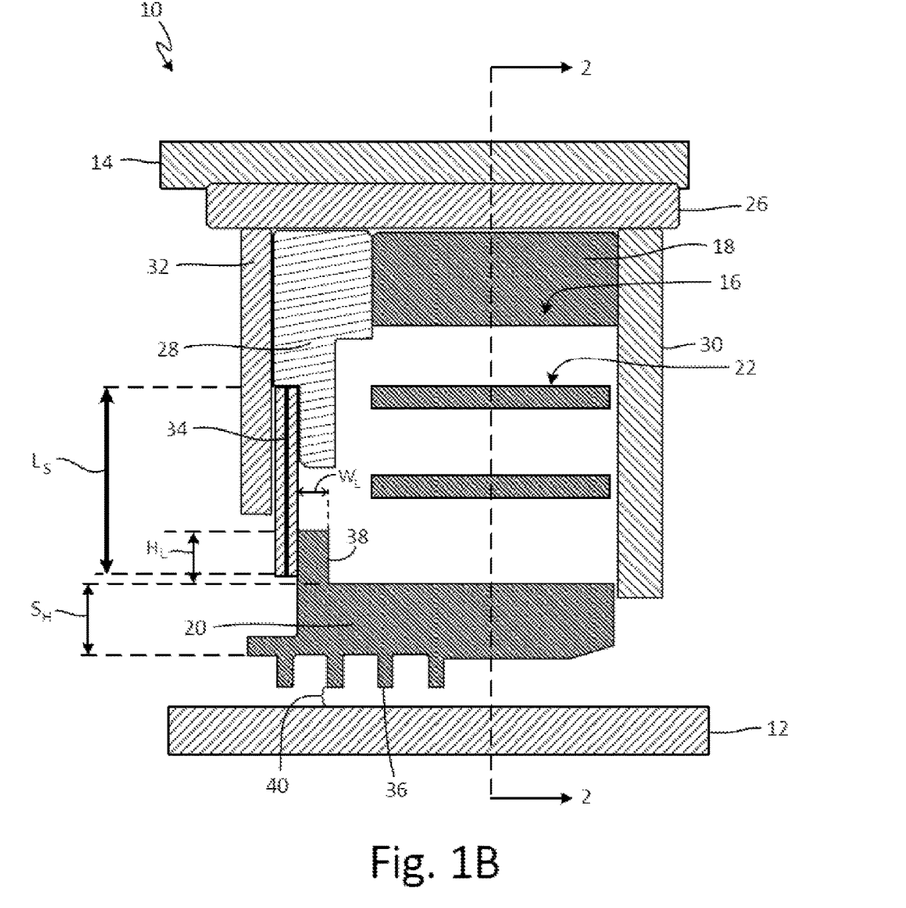
FIG. 1B is a cross-sectional view of the seal assembly with the rotating structure, the static structure, and the floating non-contact seal.
Figure 2:
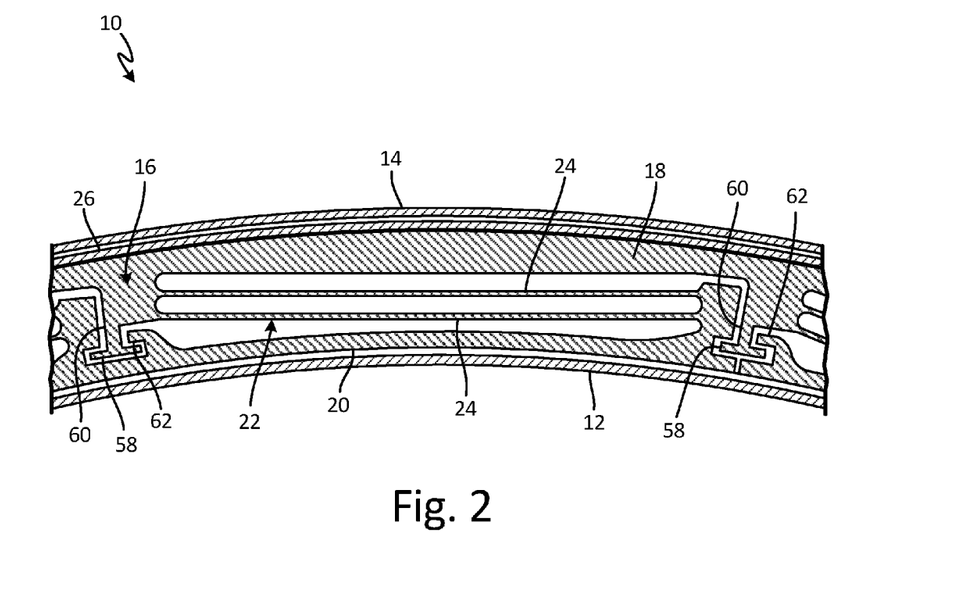
FIG. 2 is a cross-sectional view of the seal assembly with the rotating structure, the static structure, and the floating non-contact seal taken along 2-2 in FIG. 1B and such that a downstream direction is into the page.

FIGS. 1A, 1B, and 2 show different aspects of seal assembly 10 with rotating structure 12, static structure 14, and floating non-contact seal 16, and are discussed as a group below. FIGS. 1A-1B are cross-sectional views of seal assembly 10 such that a downstream direction is left to right in FIGS. 1A-1B. FIG. 2 is a cross-sectional view of seal assembly 10 and the view shown in FIG. 2 is taken of seal assembly 10 facing in an axial direction into (or out of) the page such that a downstream direction is into the page. Additionally, the view of seal assembly 10 in FIG. 2 represents a portion of an entire circumference of seal assembly 10 which extends in a complete annulus, circle, or ring. As discussed in U.S. Patent Publications US2016/0130963A1, US2015/0322816A1, and US2015/0285152A1, seal assembly 10 with floating non-contact seal 16 can be located within the turbine section of a gas turbine engine.

Seal assembly 10 includes rotating structure 12, static structure 14, and floating non-contact seal 16. Floating non-contact seal 16 includes annular base 18, shoe 20, and spring 22 with beams 24. Seal assembly 10 further includes carrier 26, spacer 28, plate 30, seal cover 32, and seals 34. Shoe 20 includes teeth 36 and lip 38. A space between rotating structure 12 and teeth 36 and forms gap 40. Shoe 20 includes upstream portion 42 and downstream portion 44. Seal assembly 10 additionally includes first channel 46, radially outward end 48 of lip 34, upstream face 50 of seals 34, downstream face 52 of seal cover 32, downstream face 54 of seals 34, and upstream face 56 of shoe 20. FIG. 2 shows seal assembly 10 additionally including shoulders 58, stem 60, and arms 62.

Rotating structure 12 includes a structure of a gas turbine engine that is rotating. In one non-limiting embodiment, rotating structure 12 includes a rotor of a compressor section or a turbine section of a gas turbine engine. Static structure 14 includes a structure of a gas turbine engine that is static or not-rotating. In one non-limiting embodiment, static structure 14 includes a stator of a compressor section or a turbine section of a gas turbine engine.

Floating non-contact seal 16 includes annular base 18, shoe 20, and spring 22 with beams 24. Floating non-contact seal 16 with annular base 18, shoe 20, and spring 22 with beams 24 can be made out of a nickel alloy material, such as an austenitic nickel-based superalloy, or other metallic alloys favorable for use in high temperature applications.

Annular base 18 includes a generally annular or ring-shaped ribbon of solid material. Shoe 20 includes a solid piece of material with a partially annular shape and a generally rectangular shaped cross-section (from the viewpoint of looking into the page in FIGS. 1A-1B). Shoe 20 also includes upstream portion 42 and downstream portion 44.

Spring 22 includes an elongate resilient element. In one non-limiting embodiment, spring 22 includes at least one of beams 24. Beams 24 include elongate resilient elements capable of springing back into shape upon radial deflection (upward or downward in FIG. 1A-1B).

Carrier 26 includes an annular ribbon or sleeve of solid material. Spacer 28 includes a ring-shaped plate of solid material. Plate 30 includes a ring-shaped plate of solid material. Plate 30 includes scallops or holes along plate 30. Seal cover 32 includes a ring of solid material.

Seals 34 include ring-shaped, or partially ring-shaped, pieces of pliant solid material, which can include a cobalt alloy or other types of metallic alloys suitable for wear resistance. Seals 34 include length $L_S$ extending in a vertical direction as shown in FIGS. 1A-1B. Teeth 36 include solid pieces of material connected to and extending radially inward (downward in FIGS. 1A-1B) from shoe 20 towards rotating structure 12.

Lip 38 includes a solid piece of material extending radially outward (upward in FIGS. 1A-1B) from and connected to shoe 20. Lip 38 includes height $H_L$ and width $W_L$. In one non-limiting embodiment, height $H_L$ of lip 38 can include a distance between 0 to 30 millimeters (0 to 1.18 inches) and width $W_L$ of lip 38 can include a distance between 0 to 20 millimeters (0 to 0.79 inches). In another non-limiting example, a ratio of height $H_L$ of lip 38 to height $S_H$ of shoe 20 is at least 1 to 2. Lip 38 can be formed out of the same piece of material as annular base 18 and shoe 20. A material used for lip 38 can include a nickel alloy material, such as an austenitic nickel-based superalloy, or other metallic alloys favorable for use in high temperature applications.

Gap 40 includes a space between teeth 36 and rotating structure 12. Upstream portion 42 of shoe 20 includes a portion of shoe 20 that is located on an upstream (to the left in FIGS. 1A-1B) end of shoe 20. Downstream portion 44 of shoe includes a portion of shoe 20 that is located on a downstream (to the right in FIGS. 1A-1B) end of shoe 20. First channel 46 includes a space between beams 24 of spring 22. Radially outward end 48 includes a portion of lip 34 that is located on a radially outward face of lip 34.

Upstream face 50 includes a face of seals 34 that faces in an upstream direction and is located at an upstream end of seals 34. Downstream face 52 includes a face of seal cover 32 that faces in a downstream direction and is located at a downstream end of seal cover 32. Downstream face 54 includes a face of seals 34 that faces in a downstream direction and is located at a downstream end of seals 34. Upstream face 56 includes a face of shoe 20 that faces in an upstream direction and is located on upstream portion 42 of shoe 20.

As shown in FIG. 2, shoulders 58 include a flat, partially-arcuate solid piece of material. Stems 60 include solid ribbon-shaped pieces of material that extend along an axial length of shoe 20. Arms 62 include lips formed of solid material that extend partially radially outward from shoe 20.

Rotating structure 12 is disposed radially within floating non-contact seal 16 and static structure 14. In other non-limiting embodiments, static structure 14 can be disposed radially within rotating structure 12 with floating non-contact seal 16 disposed between rotating structure 12 and static structure 14. Static structure 14 is radially aligned with the rotating structure 12 such that static structure 14 and rotating structure 12 are aligned in a direction extending radially outward from rotating structure 12. Floating non-contact seal 16 is disposed between rotating structure 12 and static structure 14. Floating non-contact seal In one non-limiting embodiment, floating non-contact seal 16 is attached to static structure 14 such that rotating structure 12 rotates relative to static structure 14 and floating non-contact seal 16 during operation of seal assembly 10.

Annular base 18 of floating non-contact seal 16 is connected to shoe 20 by spring 22 that extends between annular base 18 and shoe 20. In one non-limiting embodiment, spring 22 includes beams 24 which extend in an orthogonal direction (shown in FIG. 2 as horizontal) to the axial direction (in to or out of the page in FIG. 2) of seal assembly 10. Beams 24 are integrally formed with annular base 18 and shoe 20 such that annular base 18, shoe 20, and beams 24 can be formed out of a single piece of continuous material. Beams 24 include a dual-beam design in FIG. 2 which causes shoe 20 to move in a radial direction. In one non-limiting embodiment, the entire circumference of floating non-contact seal 16 can include approximately fifty shoes and corresponding springs.

Carrier 26 includes a support ring for securing floating non-contact seal 16 to static structure 14. Carrier 26 is positioned between static structure 14 and floating non-contact seal 16. In other non-limiting embodiments, carrier 26 can be a part of static structure 14.

Spacer 28 is disposed axially downstream of seal cover 32 and axially upstream of annular base 18 and beams 24. Spacer 28 is positioned between spring 22 and seals 34 to create axial spacing between beams 24 and seals 34.

Plate 30 is disposed along a downstream side of annular base 18, beams 24, and shoe 20. The scallops or holes of plate 30 allow for fluid communication across plate 30. Seal cover 32 is disposed axially upstream of seals 34.

Seals 34 are disposed axially upstream of beams 24 and come into contact with shoe 20. A portion of seals 34 are positioned between seal cover 32 and spacer 28. In one non-limiting embodiment, seals 34 overlap a portion of shoe 20 such that at least 25% of length $L_S$ of seals 34 extends radially below radially outward end 48 of lip 38. Seals 34 are disposed between seal cover 32 and shoe 20 such that upstream face 50 of seals 34 is out of contact with downstream face 52 of seal cover 32 and downstream face 54 of seals 34 is in contact with upstream face 56 of shoe 20. Upstream face 56 of shoe 20 includes a face of shoe 20 that faces in an upstream direction (to the left in FIGS. 1A-1B) and is located downstream of furthest upstream portion 57 of shoe 20.

Teeth 36 extend radially inward from shoe 20 and into gap 40. Gap 40 is formed between teeth 36 and rotating structure 12 for allowing air flow F to pass across floating non-contact seal 16 in a downstream direction (as shown by the direction of the arrowheads of air flow F). In FIG. 2, a direction of fluid flow is into the page.

Lip 38 is disposed on upstream portion 42 of shoe 20. Lip 38 extends radially outward from upstream portion 42 of shoe 20 into first channel 46 formed in the spacing between shoe 20 and the lower of beams 24. In one non-limiting example, a height of first channel 46 is greater than 25% of length $L_S$ of seals 34. Lip 38 extends part-way across the height of first channel 46. In one non-limiting example, lip 38 extends at least half-way across the height of first channel 46. Lip 38 is disposed axially upstream from spring 22. In other non-limiting embodiments, lip 38 can be welded, brazed, or otherwise attached to shoe 20. Lip 38 and shoe 20 can be formed from one continuous piece of material.

Shoulders 58 are connected to annular base 18 by stems 60. Arms 62 are attached to, or formed as a part of, shoe 20. Arms 62 form a notch with shoe 20 creating a space for shoulders 58 to be disposed in. Spacing is provided between shoulders 58 and arms 62 to allow arms 62 to move as shoe 20 moves radially inward or outward.

During operation of seal assembly 10, floating non-contact seal 16 forms a seal with rotating structure 12 to control an amount of fluid and fluid pressure travelling past floating non-contact seal 16 between components of a gas turbine engine. Floating non-contact seal 16 adapts to the change in pressure across floating non-contact seal 16 by drawing shoe 20 towards or away from rotating structure 12 to adjust gap 40 between shoe 20 and rotating structure 12.

During operation of seal assembly 10, floating non-contact seal 16 regulates air flow F from a high pressure side of floating non-contact seal 16 (to the left in FIGS. 1A-1B) to a low pressure side of floating non-contact seal 16 (to the right in FIGS. 1A-1B). As air flow F flows past teeth 36 of floating non-contact seal 16, a pressure field across seal assembly 10 changes. Shoe 20 is drawn towards or away from rotating structure 12 due to a pressure differential across a radially inward side and a radially outward side of shoe 20. If the pressure differential across shoe 20 is high, for example a pressure in first channel 46 is much lower than a pressure between shoe 20 and rotating structure 12, shoe 20 is pushed by the high pressure in a radially outward direction to allow the high pressure flow to release into the area of low pressure through plate 30 and into first channel 46. If the pressure differential across shoe 20 is low, for example the pressure in first channel 46 is greater than the pressure between shoe 20 and rotating structure 12, the radially outward force applied to shoe 20 is lessened which lowers the shoe radially inward towards rotating structure 12 restricting and thereby reducing the amount of flow F allowed past shoe 20, through plate 30, and into first channel 46.

Radially inward and outward motion of shoe 20 is limited by the configuration of shoulders 58, stems 60, and arms 62. As shoe 20 moves radially outward, arms 62 come into contact with annular base 18 which prevents a large clearance between shoe 20 and rotating structure 12 from occurring. Conversely, as shoe 20 moves radially inward, arms 62 come into contact with shoulders 58 preventing teeth 36 of shoe 20 from coming into contact with rotating structure 12.

As the pressure differential across floating non-contact seal 16 balances out, shoe 20 actuates radially outward and inward (upward and downward in FIGS. 1A-1B) until pressure equilibrium is achieved, for example a pressure of upstream of shoe 20 and a pressure downstream of shoe 20 becomes equal. The pressure equilibrium across floating non-contact seal 16 results in a force balance allowing floating non-contact seal 16 to be adaptive by allowing an adjustable size of gap 40 and maintaining tighter clearances between teeth 36 of shoe 20 and rotating structure 12. As shoe 20 actuates up and down, seals 34 slide along shoe 20 to maintain sealing and force balances.

In prior art seal assemblies, if the motion of the shoe becomes too excessive, the seals may come into contact with the shoe (in the event of radially outward deflection of the shoe), or fall off of the shoe (in the event of radially inward deflection of the shoe) such that the seals come out of contact with the shoe. If the seals come into contact with the shoe or fall off of the shoe, damage can occur to the seals and the seal assembly can leak causing the shoe to no longer function properly.

Lip 38 on floating non-contact seal 16 increases a size of the seal-land between seals 34 and shoe 20 without significantly impacting the weight or modal response of floating non-contact seal 16. Additional overlap of seals 34 over shoe 20 can be achieved with lip 38 enabling significantly increased inboard actuation of shoe 20 with a much lower risk of seals 34 falling off of shoe 20, as compared to a seal assembly without lip 38. Lip 38 also allows for additional clearance between shoe 20 and beams 24, and between shoe 20 and spacer 28 which enables significantly increased outboard motion of shoe 20 without shoe 20 coming into contact with beams 24 or with spacer 28. Additionally, the stiffness of shoe 20 is increased due to an increased moment of inertia of shoe 20 which minimizes any adverse deflection of seals 34 during operation of seal assembly 10. The addition of lip 38 in floating non-contact seal 16 also allows radially outward end 48 of lip 38 to surpass the lower of beams 24 during an outboard actuation of shoe 20 which results in a better ability to package and size components for seal assembly 10.

Figure 3A:
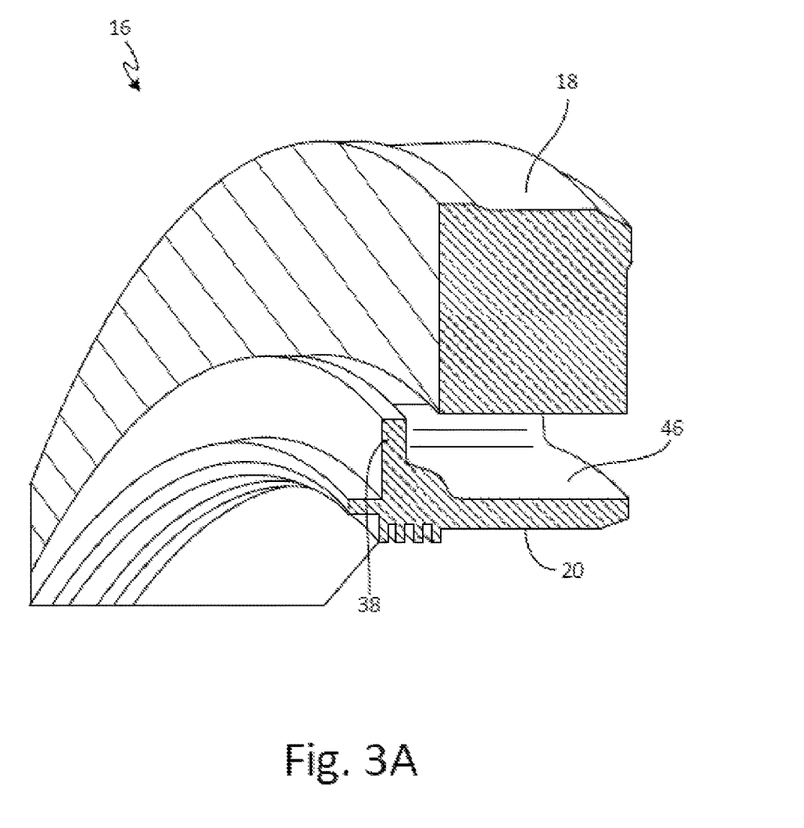
FIG. 3A is a partial perspective view of the floating non-contact seal after a first stage of manufacturing.

FIG. 3A is a partial perspective view of floating non-contact seal 16 after a first stage of manufacturing. In FIG. 3A, floating non-contact seal 16 is shown to include annular base 18, shoe 20, lip 38, and first channel 46. Before first channel 46 is formed in, or cut out of, annular base 18, stock material is machined by removing a first amount of material to create annular base 18.

Typically, in seal assemblies without a lip on shoe 20, various manufacturing methods are used to cut out first channel 46 from annular base 18, such methods requiring a horizontal cut all the way through annular base 18 thereby preventing formation of a lip on top of shoe 20 in first channel 46.

In floating non-contact seal 16, first channel 46 can be formed through plunge electro-discharge machining ("EDM") to remove a second amount of material from annular base 18 forming first channel 46 with a lip 38 extending part-way across a height of first channel 46. Plunge EDM includes the use of an electrode, usually made of a graphite or similar material, which is shaped like the cavity to be produced, in this instance the shape of first channel 46. The electrode is "plunged" or "sunk" into the part and effectively burns out material in the part to produce the desired cavity shape.

The use of plunge EDM allows cuts to be made into annular base 18 that do not extend all the way through annular base 18 allowing for the creation of lip 38 in floating non-contact seal 16. The use of plunge EDM is preferable due to the relatively small size of floating non-contact seal 16. The cuts made during formation of floating non-contact seal 16 can be tens of thousandths of an inch, making it difficult to use, for example, a CNC milling machine to access floating non-contact seal 16 without damaging floating non-contact seal 16. Traditional manufacturing would have to be very small and thus susceptible to damage, in order to be effective. There would also be significant distortion on floating non-contact seal 16 under the machining forces of conventional (non-plunge EDM) machines.

In other non-limiting embodiments, other forms of manufacturing can be used which allow for variable depth material removal from a stock piece of material such as machine drilling, milling, and/or boring.

Figure 3B:
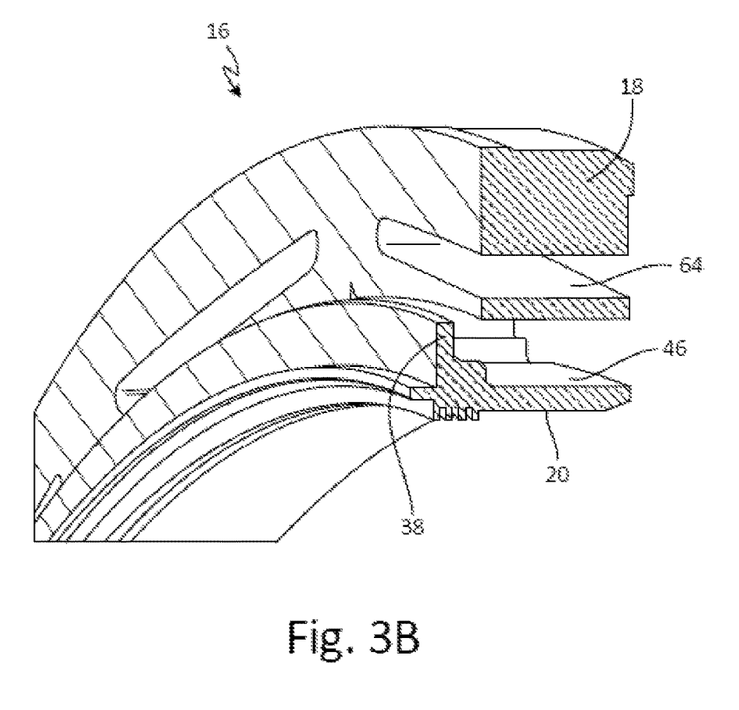
FIG. 3B is a partial perspective view of the floating non-contact seal after a second stage of manufacturing.

FIG. 3B is a partial perspective view of floating non-contact seal 16 after a second stage of manufacturing. In FIG. 3B, floating non-contact seal 16 is shown to include annular base 18, shoe 20, lip 38, first channel 46, and second channel 64. Second channel 64 is formed by performing wire EDM to remove a third amount of material from annular base 18 creating a first set of channels including second channel 64. In another non-limiting embodiment, the first set of channels can be formed by removing material from annular base 18 with a water jet or water jet cutting tool, as well as by other forms of subtractive manufacturing methods (known generally as methods by which material is removed from a piece of stock material).

In other non-limiting embodiments, other forms of manufacturing can be used for the second stage of manufacturing which allow for variable depth material removal from a stock piece of material such as machine drilling, milling, and/or boring.

Figure 3C:
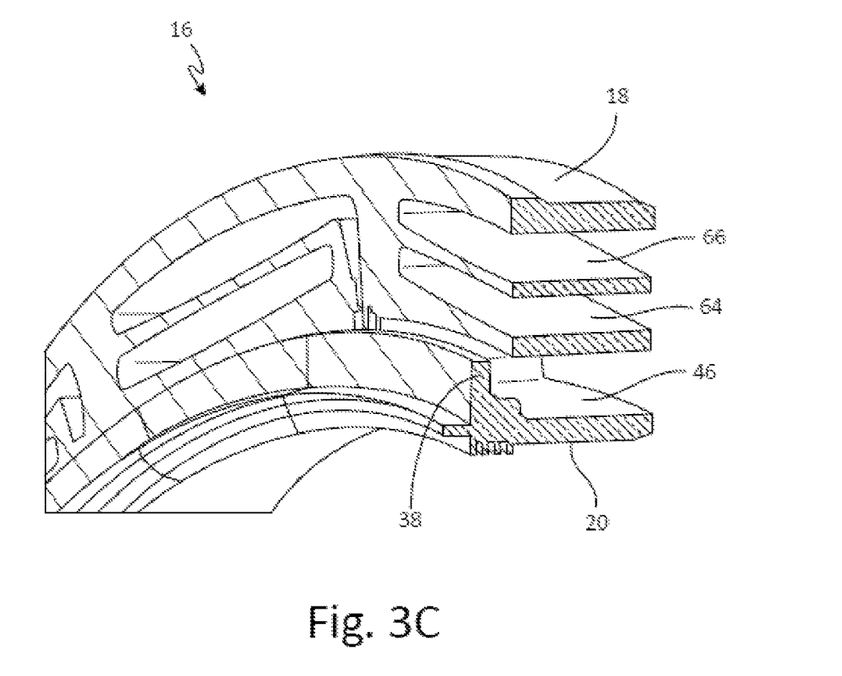
FIG. 3C is a partial perspective view of the floating non-contact seal after a third stage of manufacturing.

FIG. 3C is a partial perspective view of floating non-contact seal 16 after a third stage of manufacturing. In FIG. 3C, floating non-contact seal 16 is shown to include annular base 18, shoe 20, lip 38, first channel 46, second channel 64, and third channel 66. Third channel 66 is formed during removal of the third amount of material from annular base 18 by performing wire EDM creating the first set of channels which also includes second channel 64. In other non-limiting embodiments, second channel 64 and third channel 66 can be formed concurrently or at different stages of the manufacturing method or process. Additionally, annular base 18 may include more or less channels than first channel 46, second channel 64, and third channel 66.

In other non-limiting embodiments, other forms of manufacturing can be used for the third stage of manufacturing which allow for variable depth material removal from a stock piece of material such as machine drilling, milling, and/or boring.

DISCUSSION OF POSSIBLE EMBODIMENTS

The following are non-exclusive descriptions of possible embodiments of the present invention.

A seal assembly can include an annular base, a spring, a shoe, a first channel, a seal cover, and/or a seal. The spring can include a beam and can be connected to the annular base. The shoe can be disposed radially inward of the annular base and connected to the spring. The shoe can include an upstream portion, a downstream portion, and/or a lip connected to and extending radially outward from the upstream portion of the shoe. The spring extends from the annular base to the shoe. The first channel can be positioned between the shoe and the beam of the spring. The seal can be disposed between the seal cover and the shoe such that a downstream face of the seal can be in contact with an upstream face of the shoe.

The assembly of the preceding paragraph can optionally include, additionally and/or alternatively, any one or more of the following features, configurations and/or additional components.

The downstream face of the seal can be in contact with the lip.

The seal can overlap a portion of the shoe such that the seal can extend radially inward of a radially outward end of the lip of the shoe.

The lip can be disposed axially upstream from the spring.

The lip can extend at least half-way across the height of the first channel between the shoe and the beam of the spring.

The height of the first channel can be greater than 25% of the length of the seal.

A ratio of a height of the lip to a height of the shoe can be at least 1 to 2.

A height of the lip can comprise a distance between 0 to 30 millimeters (0 to 1.18 inches).

A height of the lip can comprise a distance between 0 to 20 millimeters (0 to 0.79 inches).

The connection between the lip and the shoe can comprise a connection formed by brazing or welding.

The lip and the shoe can comprise one continuous piece of material.

A method of manufacturing a floating non-contact seal can include machining material stock by removing a first amount of material to create an annular base. Plunge electro-discharge machining can be performed to remove a second amount of material from the annular base forming a first channel with a lip that can extend part-way across a height of the first channel. Wire electro-discharge machining can then performed to remove a third amount of material from the annular base that can create a first set of channels.

The method of the preceding paragraph can optionally include, additionally and/or alternatively, any one or more of the following features, configurations and/or additional components.

The lip can be formed to extend at least half-way across the height of the first channel.

The lip and/or the shoe can be formed such that a height of the lip to a height of the shoe can be at least 1 to 2.

The lip can be formed to comprise a height of between 0 to 30 millimeters (0 to 1.18 inches).

The lip can be formed to comprise a height of between 0 to 20 millimeters (0 to 0.79 inches).

A seal assembly that can be disposed in a gas turbine engine can include a rotating structure, a static structure, and/or a floating non-contact seal. The static structure can be radially aligned with the rotating structure. The floating non-contact seal can be disposed between the rotating structure and the static structure. The floating non-contact seal can include an annular base, a spring, a shoe, a first channel, a seal cover, and/or a seal. The spring can include a beam and can be connected to the annular base. The shoe can be disposed radially inward of the annular base and connected to the spring. The shoe can include an upstream portion, a downstream portion, and/or a lip connected to and extending radially outward from the upstream portion of the shoe. The spring extends from the annular base to the shoe. The first channel can be positioned between the shoe and the beam of the spring. The seal can be disposed between the seal cover and the shoe such that a downstream face of the seal can be in contact with an upstream face of the shoe.

The seal can overlap a portion of the shoe such that the seal can extend radially inward of a radially outward end of the lip of the shoe.

The lip can be disposed axially upstream from the spring.

The lip can extend at least half-way across the height of the first channel between the shoe and the beam of the spring.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly comprising:
    an annular base;
    a spring with a beam, wherein the spring is connected to the annular base;
    a shoe disposed radially inward of the annular base and connected to the spring, the spring extending from the annular base to the shoe, wherein the shoe comprises:
        an upstream portion;
        a downstream portion; and
        a lip connected to and extending radially outward from the upstream portion of the shoe;
    a first channel between the shoe and the beam of the spring;
    a seal cover disposed axially upstream of and adjoining the annular base; and
    a seal disposed between the seal cover and the shoe, wherein a downstream face of the seal is in contact with an upstream face of the shoe at the lip, wherein the upstream face of the shoe is located downstream of a furthest upstream portion of the shoe.

2. The seal assembly of claim 1 and further wherein the downstream face of the seal is in contact with the lip.

3. The seal assembly of claim 1, wherein the seal overlaps a portion of the shoe such that the seal extends radially inward of a radially outward end of the lip of the shoe.

4. The seal assembly of claim 1, wherein the lip is disposed axially upstream from the spring.

5. The seal assembly of claim 1 and further wherein the lip extends at least half-way across a height of the first channel between the shoe and the beam of the spring.

6. The seal assembly of claim 1, wherein a height of the first channel is greater than 25% of the length of the seal.

7. The seal assembly of claim 1, wherein a ratio of a height of the lip to a height of the shoe is at least 1 to 2.

8. The seal assembly of claim 1, wherein a height of the lip comprises a distance greater than 0 millimeters and less than 30 millimeters (0 to 1.18 inches).

9. The seal assembly of claim 1, wherein a width of the lip comprises a distance greater than 0 millimeters and less than 20 millimeters (0 to 0.79 inches).

10. The seal assembly of claim 1, wherein the connection between the lip and the upstream portion of the shoe comprises:
    a connection formed by brazing or welding.

11. The seal assembly of claim 1 and further wherein the lip and the upstream portion of the shoe comprise one continuous piece of material.

12. A seal assembly disposed in a gas turbine engine, the seal assembly comprising:
    a rotating structure;
    a static structure radially aligned with the rotating structure; and
    a floating non-contact seal disposed between the rotating structure and the static structure, the floating non-contact seal comprising:
        an annular base;
        a spring with a beam, wherein the spring is connected to the annular base;
        a shoe disposed radially inward of the annular base and connected to the spring, the spring extending from the annular base to the shoe, wherein the shoe comprises:
            an upstream portion;
            a downstream portion; and
            a lip connected to and extending radially outward from the upstream portion of the shoe;
        a first channel between the shoe and the beam of the spring;
        a seal cover disposed axially upstream of and adjoining the annular base; and
        a seal disposed between the seal cover and the shoe, wherein a downstream face of the seal is in contact with an upstream face of the shoe at the lip, wherein the upstream face of the shoe is located downstream of a furthest upstream portion of the shoe.

13. The seal assembly of claim 12, wherein the seal overlaps a portion of the shoe such that the seal extends radially inward of a radially outward end of the lip of the shoe.

14. The seal assembly of claim 12, wherein the lip is disposed axially upstream from the spring.

15. The seal assembly of claim 12 and further wherein the lip extends at least half-way across a height of the first channel between the shoe and the beam of the spring.

* * * * *